US008706642B2

(12) United States Patent  
Cannady et al.

(10) Patent No.: US 8,706,642 B2
(45) Date of Patent: Apr. 22, 2014

(54) APPARATUS, SYSTEM, AND METHOD FOR SECURELY AUTHORIZING CHANGES TO A TRANSACTION RESTRICTION

(75) Inventors: Stacy John Cannady, Knightdale, NC (US); David Carroll Challener, Raleigh, NC (US); Daryl Cromer, Cary, NC (US); Mark Charles Davis, Durham, NC (US); David Rivera, Durham, NC (US); Randall Scott Springfield, Chapel Hill, NC (US); Rod D. Waltermann, Rougemont, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 1659 days.

(21) Appl. No.: 11/609,814

(22) Filed: Dec. 12, 2006

(65) Prior Publication Data  
US 2008/0140575 A1 Jun. 12, 2008

(51) Int. Cl.  
*G06Q 20/00* (2012.01)

(52) U.S. Cl.  
USPC .............. 705/67; 705/44; 705/65; 705/64; 380/229; 713/155; 713/156; 713/157; 713/158; 713/159

(58) Field of Classification Search  
None  
See application file for complete search history.

(56) References Cited

U.S. PATENT DOCUMENTS

2005/0144136 A1\* 6/2005 Murashita ........................ 705/51  
2009/0044007 A1\* 2/2009 Ferrazzini et al. ............ 713/155

\* cited by examiner

*Primary Examiner* — James A Reagan  
(74) *Attorney, Agent, or Firm* — Kunzler Law Group

(57) ABSTRACT

An apparatus, system, and method are disclosed for securely authorizing changes to a transaction restriction. A security module securely stores encryption keys for a payment instrument. The payment instrument electronically transacts payments and includes a transaction restriction. An authentication module receives an authentication from a user of the payment instrument. The security module validates the authentication with a first encryption key. In addition, the security module authorizes a change to the transaction restriction using a second encryption key if the authentication is valid. The security module resides on a computer that the user designates as authorized to validate the authentication.

20 Claims, 6 Drawing Sheets

APPARATUS, SYSTEM, AND METHOD FOR SECURELY AUTHORIZING CHANGES TO A TRANSACTION RESTRICTION

BACKGROUND OF THE INVENTION

1. Field of the Invention

This invention relates to authorizing changes and more particularly relates to securely authorizing changes to a transaction restriction.

2. Description of the Related Art

Payment instruments such as radio frequency identification (RFID) tags, Smart Card® electronic cards, and cards with magnetic stripes are often used to electronically transact payments. For example, a user may pay for a soft drink at a vending machine using an RFID tag that authorizes payment from a user financial account to the an account for an owner of the vending machine. Similarly, the user may pay for an airline ticket using a credit card configured with a security processor.

The payment instrument may have a transaction restriction. For example, the RFID tag may be limited to payments totaling $100 or less during a week. Similarly, the credit card may be limited to authorizing $1,000 in online purchases in a month.

Transaction restrictions limit losses if a payment instrument is fraudulently employed. Continuing the example above, if the user's RFID tag is stolen, the user's monetary loss may be limited to $100 as the user may cancel the RFID tag before more than $100 is expended.

Unfortunately, the user may reach a limit of a transaction restriction for a payment instrument and still desire to transact additional payments using the payment instrument. For example, the user may make payments totaling $95 with the RFID tag over two days, and still want to purchase meals and the like using the RFID tag over the remainder of the week.

The user may conveniently authorize changes to transaction restrictions through the Internet. However, allowing online transaction restriction changes puts the user at risk if passwords and/or account numbers for the payment instrument are also lost and/or stolen along with the payment instrument.

SUMMARY OF THE INVENTION

From the foregoing discussion, there is a need for an apparatus, system, and method that securely authorizes changes to a transaction restriction. Beneficially, such an apparatus, system, and method would protect against unauthorized changes to a payment instrument transaction restriction.

The present invention has been developed in response to the present state of the art, and in particular, in response to the problems and needs in the art that have not yet been fully solved by currently available secure authorization methods. Accordingly, the present invention has been developed to provide an apparatus, system, and method for securely authorizing changes to a transaction restriction that overcome many or all of the above-discussed shortcomings in the art.

The apparatus to securely authorize changes to a transaction restriction is provided with a plurality of modules configured to functionally execute the steps of securely storing encryption keys in a security module of a designated computer, receiving an authorization, validating the authorization, and authorizing a change to a transaction restriction. These modules in certain embodiments include a payment instrument, an authentication module, and a security module. The apparatus may also include a modification module.

The payment instrument electronically transacts payments. In addition, the payment instrument includes a transaction restriction. The authentication module receives an authentication from a user of the payment instrument.

The security module securely stores encryption keys. In addition, the security module validates the authentication with a first encryption key and authorizes a change to the transaction restriction using a second encryption key if the authentication is valid. The security module resides on a computer that the user designates as authorized to validate the authentication.

In one embodiment, the modification module changes the transaction restriction using the second encryption key. The apparatus securely authorizes the change to the transaction restriction using both the authentication and the designation of the computer as authorized to validate the authentication.

A system of the present invention is also presented to securely authorize changes to a transaction restriction. The system may be embodied in a computer. In particular, the system, in one embodiment, includes a computer and a payment instrument. The computer may include an authentication module, a security module, and a modification module.

The payment instrument electronically transacts payments for a user and includes a transaction restriction. The user designates the computer as authorized to validate an authentication for changing the transaction restriction. The authentication module receives the authentication from the user of the payment instrument.

The security module securely stores encryption keys. In addition, the security module validates the authentication with a first encryption key and authorizes a change to the transaction restriction using a second encryption key if the authentication is valid. The modification module changes the transaction restriction using the second encryption key. The system securely modifies the transaction restriction using the authorized computer to validate the authentication.

A method of the present invention is also presented for securely authorizing changes to a transaction restriction. The method in the disclosed embodiments substantially includes the steps to carry out the functions presented above with respect to the operation of the described apparatus and system. In one embodiment, the method includes securely storing encryption keys in a security module of a designated computer, receiving an authorization, validating the authorization, and authorizing a change to a transaction restriction.

A security module securely stores encryption keys. A payment instrument electronically transacts payments. In addition, the payment instrument includes a transaction restriction. An authentication module receives an authentication from a user of the payment instrument.

The security module validates the authentication with a first encryption key. In addition, the security module authorizes a change to the transaction restriction using a second encryption key if the authentication is valid. The security module resides on a computer that the user designates as authorized to validate the authentication. The method securely authorizes the change to the transaction restriction by requiring both the authentication and the use of the computer designated as authorized to validate the authentication.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention securely authorizes a change to a transaction restriction using both an authentication and a computer designated to validate the authentication. The present invention may increase the security of the authentication by restricting the set of computers that may authorize the change. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
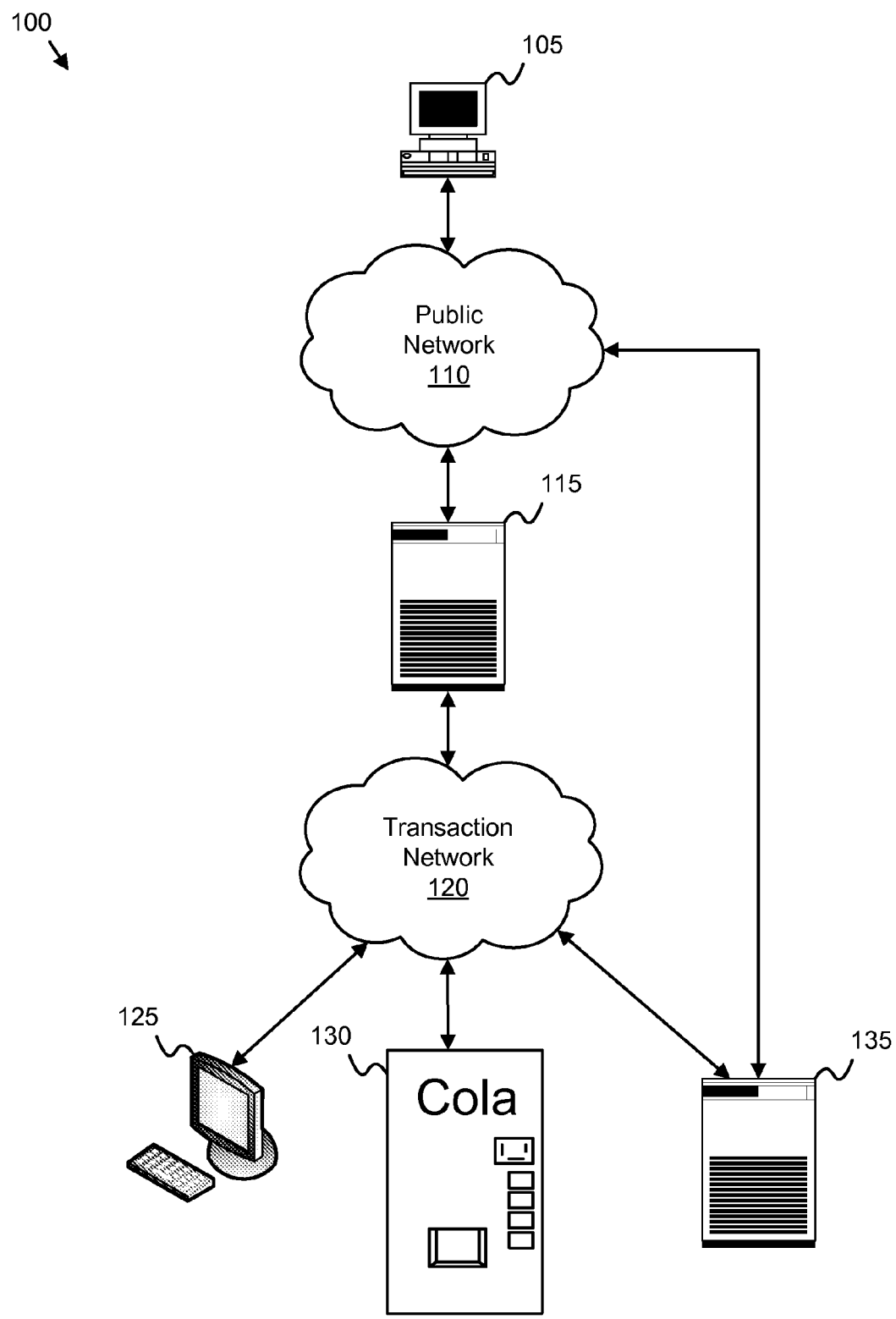
FIG. 1 is a schematic block diagram illustrating one embodiment of a transaction system.

FIG. 1 is a schematic block diagram illustrating one embodiment of a transaction system 100. The system 100 includes an authorized computer 105, a public network 110, a payment server 115, a transaction network 120, a point-of-sale (POS) station 125, a vending machine 130, and a transaction server 135. The POS station 125, vending machine 130, and transaction server 135 are representative of numerous devices that may receive a payment from a payment instrument. One of skill in the art will recognize that many other devices could also receive payment from the payment instrument.

The authorized computer 105 communicates with the payment server 115 over the public network 110. The public network 110 may be the Internet, a wide area network (WAN), a local area network (LAN), or the like. The POS station 125, vending machine 130, and transaction server 135 communicate with the payment server 115 over the transaction network 120. The transaction network 120 may also be the Internet, a WAN, a LAN, or the like.

The payment server 115 allows the payment instrument to transact payments. The payment instrument may be an RFID tag, a credit card, and the like, and will be described hereafter.

For example, a user may purchase a purchase item from the vending machine using an RFID tag payment instrument. The vending machine 130 may communicate a pending payment to the payment server 115 over the transaction network 120. The payment server 115 may either authorize the payment or reject the payment.

If the payment server 115 authorizes the payment, the payment server 115 may communicate the authorization to the vending machine 130 and the vending machine 130 may dispense the purchase item. In addition, the payment server 115 may debit an account associated with the RFID tag payment instrument. For example, if the RFID tag payment instrument account has an initial credit balance of $82.50 and the payment is for $1.00, the payment server 115 may deduct the $1.00 from the account for a new credit balance of $81.50. Alternatively, the payment server 115 may record a charge against the account. Continuing the previous example, the payment server 115 may record a charge of $1.00 for the purchase item in the RFID tag payment instrument account.

Similarly, the user may employ a payment instrument at the POS station 125. The POS station 125 may be disposed in a checkout line of a retail store. In addition, the user may make an online purchase from the authorized computer 105 through the public network 110 to the transaction server 135. The POS station 125 and/or transaction server 135 may communicate a pending payment to the payment server 115, and the payment server 115 may authorize or reject the payment.

The payment instrument may include one or more transaction restrictions. The payment server 115 may authorize or reject pending payments in response to the payment restrictions. For example, the payment instrument may limit purchases to $100 per week. Thus, if the user attempted to purchase a purchase item costing $16.19 at the POS station 125 with the purchase instrument and the user had transacted a payment of $93.27 the previous day, the payment server 115 may reject the payment as exceeding a transaction restriction.

The transaction restriction may be designed to prevent fraud. For example, if the user lost the purchase instrument, a $100 per week purchase limit may reduce the cost to the user if the lost purchase instrument is fraudulently used. However, the user may wish to continue using the payment instrument after a transaction restriction is reached. Continuing the preceding example, the user may wish to reset the transaction restriction on the payment instrument so that user may transact $100 in payments over the subsequent week. The present invention allows the user to securely authorize changes to the transaction restriction, increasing the utility of the purchase instrument.

Figure 2:
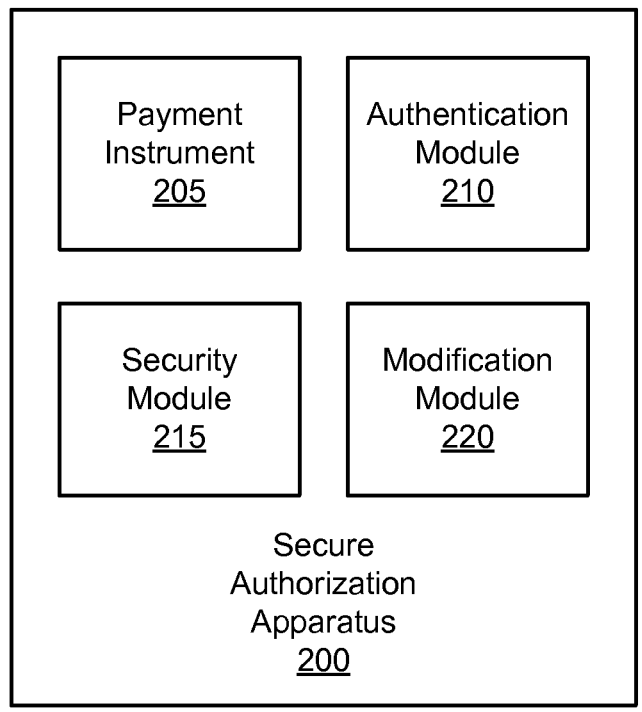
FIG. 2 is a schematic block diagram illustrating one embodiment of a secure authorization apparatus of the present invention.

FIG. 2 is a schematic block diagram illustrating one embodiment of a secure authorization apparatus 200 of the present invention. The apparatus 200 allows the user to securely authorize changes to a payment instrument 205. The description of the apparatus 200 refers to elements of FIG. 1, like numbers referring to like elements. The apparatus 200 includes the payment instrument 205, an authentication instrument 210, a security module 215, and a modification module 220.

The payment instrument 205 electronically transacts payments. In one embodiment, the payment instrument 205 includes a digital identifier that may be retrieved from the payment instrument 205. The digital identifier may be recorded in on a magnetic stripe, stored in a semiconductor device, recorded on a holographic media, broadcast by an RFID device, or the like.

The payment instrument 205 further includes the transaction restriction. The transaction restriction may be a payment limit for a specified time period such as a limit of $3,000 in outstanding charges over a month. Alternatively, the transaction restriction may be a restriction on where payments may be transacted such as limiting payments to a university campus. In a certain embodiment, the transaction restriction may limit the types of items purchased, such limiting purchases to gasoline and auto care products.

The authentication module 210 receives an authentication from a user of the payment instrument 205. The authentication module 210 may comprise one or more software processes executing on the authorized computer 105. In a certain embodiment, the authentication module 210 comprises one or more authentication devices. The authentication is directed to authorizing changes to one or more transaction restrictions of the payment instrument 205. The authentication may be a biometric authentication. In one embodiment, the authorization module 210 comprises as a fingerprint authentication module and the authentication is a fingerprint authentication as will be described hereafter.

The security module 215 securely stores encryption keys. In one embodiment, the security module 215 is a Trusted Platform Module (TPM) as defined by the Trusted Computing Group. In addition, the security module 215 validates the authentication with a first encryption key and authorizes a change to the transaction restriction using a second encryption key if the authentication is valid. The security module 215 resides on the authorized computer 105 that the user designates as authorized to validate the authentication.

In one embodiment, the modification module 220 changes the transaction restriction using the encryption key as will be described hereafter. The modification module 220 may be configured as one or more software processes. The software processes of the modification module 220 may execute on the payment server 115. Alternatively, the software processes of the modification module 220 may execute on the authorized computer 105. In a certain embodiment, the software processes of the modification module 220 execute on both the payment server 105 and the authorized computer 105. The apparatus 200 securely authorizes the change to the transaction restriction using both the authentication and the authorized computer 105.

Figure 3:
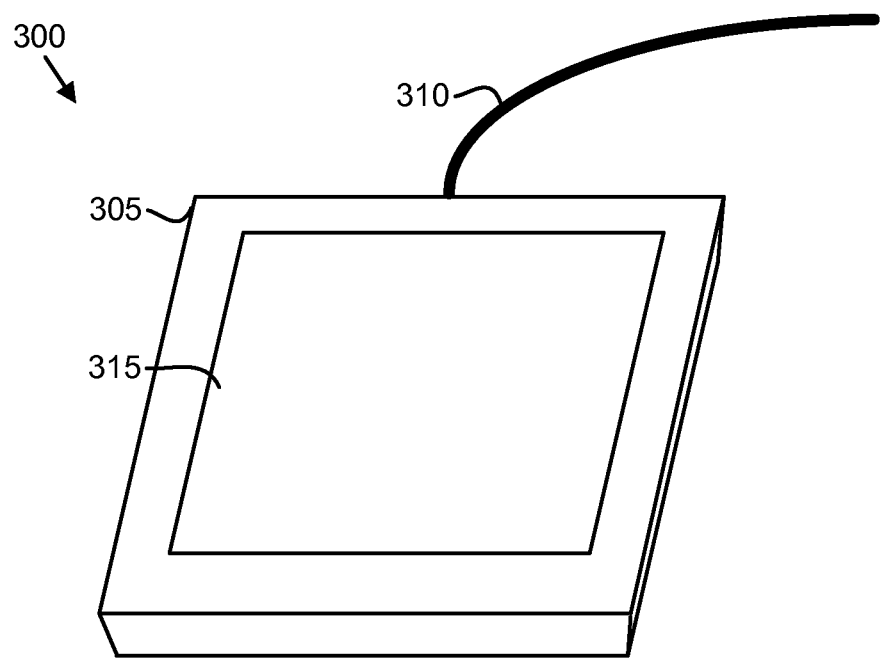
FIG. 3 is a perspective drawing illustrating one embodiment of a fingerprint authentication module of the present invention.

FIG. 3 is a perspective drawing illustrating one embodiment of a fingerprint authentication module 300 of the present invention. The module 300 includes a body 305, a cable 310, and a sensor plate 315. The description of the module 300 refers to elements of FIGS. 1-2, like numbers referring to like elements.

The cable 310 maybe connected to the authorized computer 105. The cable 310 may be a Universal Serial Bus (USB) cable, a 1394 compliant cable as defined by specification 1394 of the Institute of Electrical and Electronic Engineers, or the like. The body 305 houses electrical devices that are in communication with the sensor plate 315.

The user may place in finger on the sensor plate 315. The module 300 may construct a digital representation of the user's fingerprint from a scanned image, from tactile sensing, or the like. The fingerprint authentication module 300 may transmit the digital representation as an authentication to the authorized computer 105.

Figure 4:
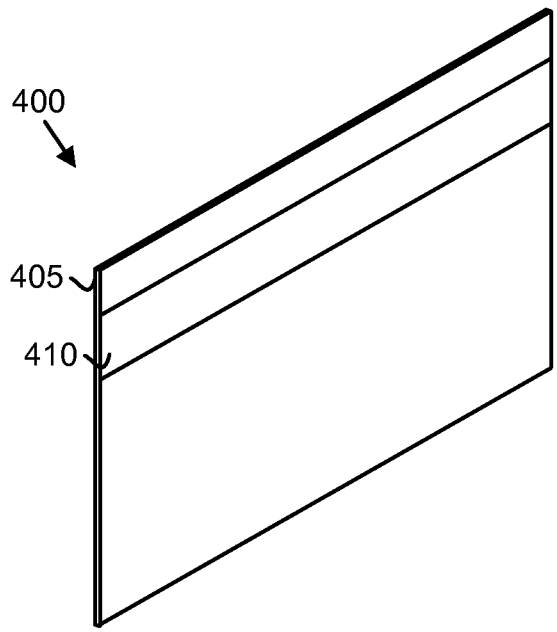
FIG. 4 is a perspective drawing illustrating one embodiment of a transaction card of the present invention.

FIG. 4 is a perspective drawing illustrating one embodiment of a transaction card 400 of the present invention. The card 400 includes a card base 405 and a magnetic stripe 410. A digital identifier may be encoded on the magnetic stripe 410. The digital identifier may be retrieved from the magnetic stripe 410 using a card reader as is well known to those of skill in the art.

Figure 5:
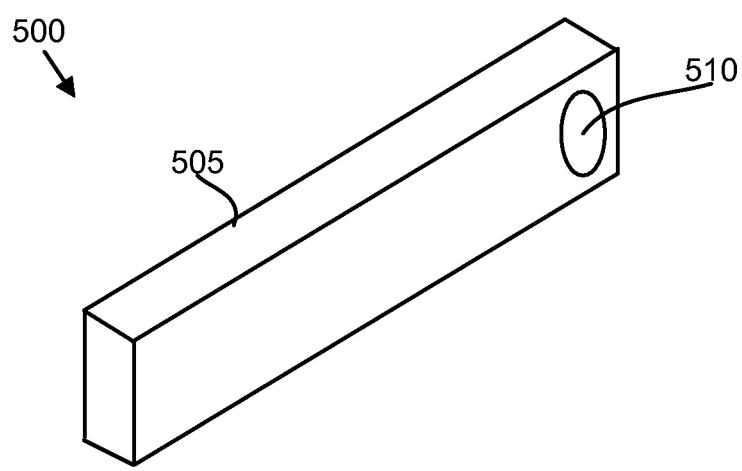
FIG. 5 is a perspective drawing illustrating one embodiment of a RFID tag of the present invention.

FIG. 5 is a perspective drawing illustrating one embodiment of a RFID tag 500 of the present invention. The RFID tag 500 includes a body 505. In addition, the RFID tag 500 may include a hole 510. The hole 510 may allow the RFID tag 500 to be attached to a key ring, a lanyard, or the like. An RFID device may be disposed with the body 505 as will be described hereafter. The user may transact a payment with the RFID tag 500 by placing the tag 500 near a reader.

Figure 6:
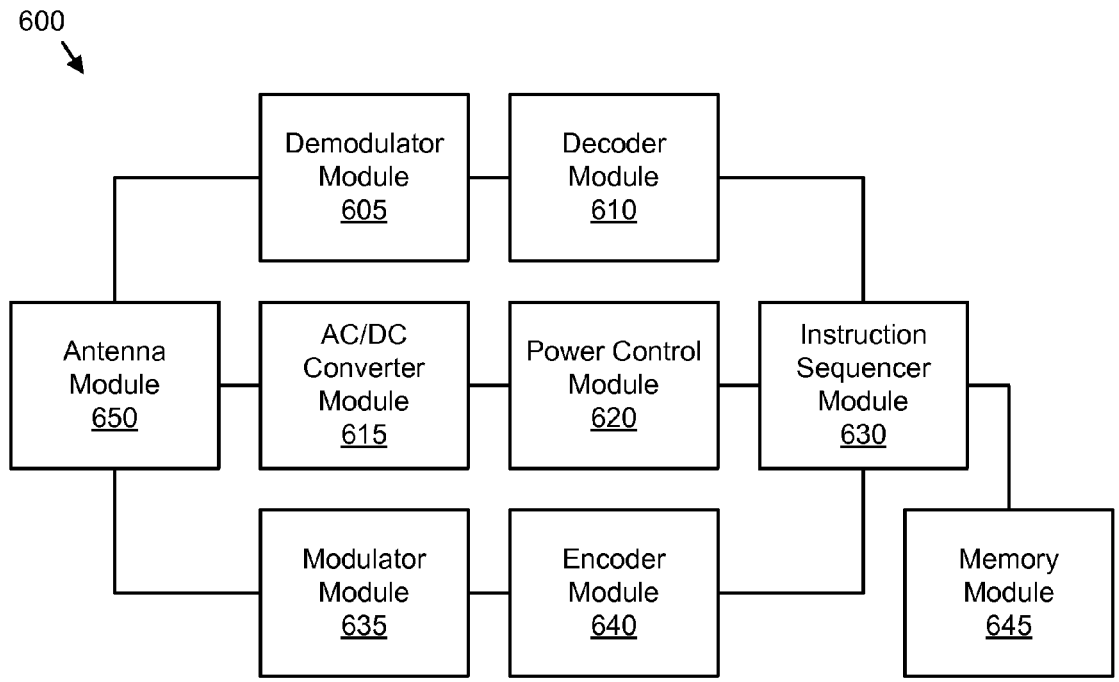
FIG. 6 is a schematic block diagram illustrating one embodiment of a RFID device of the present invention.

FIG. 6 is a schematic block diagram illustrating one embodiment of a RFID device 600 of the present invention. The RFID device 600 may be embodied in one or more semiconductor components. In addition, the RFID tag 500 of FIG. 5 may contain the RFID device 600. The RFID device 600 includes a demodulator module 605, decoder module 610, antenna module 650, analog current/direct current (AC/DC) converter module 615, power control module 620, instruction sequencer module 630, modulator module 635, encoder module 640, and memory module 645.

The antenna module 650 may receive a radio frequency signal from an RFID reader. The RFID reader will be described hereafter. The AC/DC converter module 615 converts the radio frequency signal into direct current. The direct current powers the RFID device 600. The power control module 620 controls the distribution of the direct current within the RFID device 600.

The demodulator module 605 demodulates a request signal from the radio frequency signal carrier wave. The request signal may encode a request for RFID devices 600 to identify themselves to the RFID reader that is referred to herein as an identification request. The decoder module 610 decodes the request signal into one or more binary words. The binary words may embody the identification request.

The instruction sequencer module 630 begins to function when the direct current power is available in response to receiving the radio frequency signal. The instruction sequencer module 630 executes one or more software processes that are stored in the memory module 645. The memory module 645 may be configured as a semiconductor memory.

The instruction sequencer module 630 may receive the identification request from the decoder module 610 and in response to the identification request retrieve a digital identifier from the memory module 645. The digital identifier may be a plurality of binary bits organized as one or more binary words. The binary words may encode a serial number, an encryption key, or the like.

The encoder module 640 encodes the digital identifier for transmission. The modulator module 635 modulates the encoded digital identifier with a carrier wave. The antenna module 650 transmits the encoded digital identifier as a response radio frequency signal.

Figure 7:
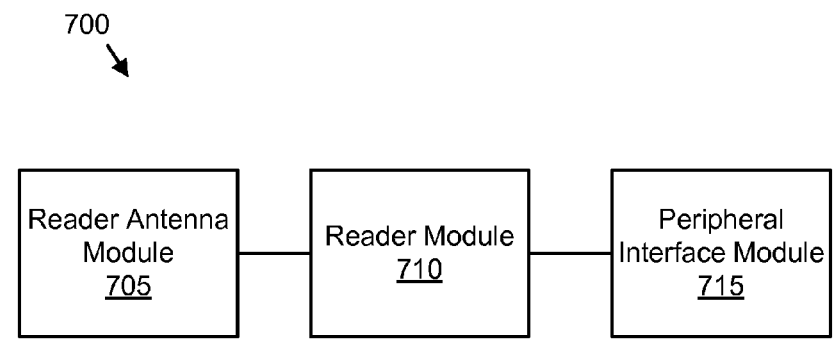
FIG. 7 is a schematic block diagram illustrating one embodiment of a RFID reader of the present invention.

FIG. 7 is a schematic block diagram illustrating one embodiment of a RFID reader 700 of the present invention. The reader 700 retrieves the digital identifier from the RFID device 600 of FIG. 6. The description of the reader 700 refers to elements of FIGS. 1-6, like numbers referring to like elements. The reader 700 includes a reader antenna module 705, a reader module 710, and a peripheral interface module 715.

In one embodiment, the reader 700 may communicate with a data processing device such as the POS station 125 or the vending machine 130 through the peripheral interface module 715. The reader module 710 generates the request signal encoding the identification request and transmits the request signal through the reader antenna module 705. In one embodiment, the reader 710 periodically generates the request signal. Alternatively, the reader 710 may generate the request signal in response to a command received through the peripheral interface module 715.

The RFID device 600 receives the request signal and responds with the response radio frequency signal as described for FIG. 6. The reader antenna module 705 receives the response radio frequency signal and the reader module 710 retrieves the digital identifier from the response radio frequency signal. The reader module 710 further communicates the digital identifier through the peripheral interface module 715. Thus the reader 710 may retrieve the digital identifier from the RFID device 600 of the RFID tag 500 and communicate the digital identifier to the POS station 125 and/or vending machine 130.

Figure 8:
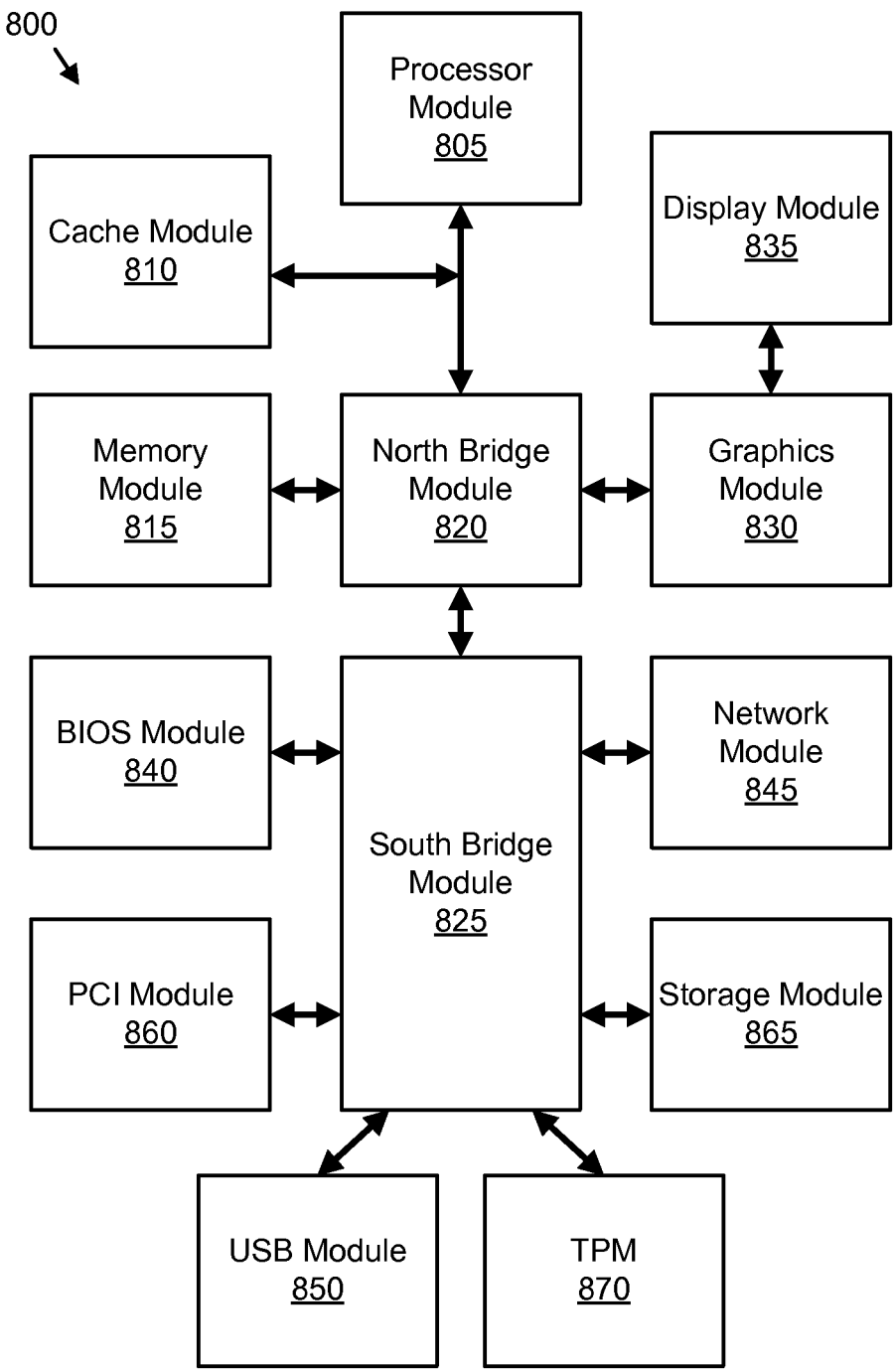
FIG. 8 is a schematic block diagram illustrating one embodiment of a computer of the present invention.

FIG. 8 is a schematic block diagram illustrating one embodiment of a computer 800 of the present invention. The computer 800 includes a processor module 805, a cache module 810, a memory module 815, a north bridge module 820, a south bridge module 825, a graphics module 830, a display module 835, a basic input/output system ("BIOS") module 840, a network module 845, a USB module 850, a Peripheral Component Interconnect ("PCI") module 860, a storage module 865, and a TPM 870. In one embodiment, the computer 800 is the authorized computer 105 of FIG. 1. The description of the computer 800 refers to elements of FIGS. 1-7, like numbers referring to like elements.

The processor module 805, cache module 810, memory module 815, north bridge module 820, south bridge module 825, graphics module 830, display module 835, BIOS module 840, network module 845, USB module 850, PCI module 860, storage module 865, and TPM 870, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory module 815 stores software instructions and data. The processor module 805 executes the software instructions and manipulates the data as is well know to those skilled in the art.

The TPM 870 may securely store encryption keys. In addition, the TPM 870 may embody the security module 215 of FIG. 2. In one embodiment, the encryption keys may be configured as numbers and/or alphanumeric strings. The encryption keys may contain alphanumeric characters in the range of sixty-four to five hundred and twelve (64-512) characters. The encryption keys may be configured as symmetric keys, asymmetric keys, or the like. The TPM 870 may only grant access to specified encryption keys in response to receiving a specified authentication.

In addition, the TPM 870 may notify the user if encryption keys and/or other secure data is modified without authorization. In one embodiment, the TPM 870 includes a random number generator. The random number generator may generate the encryption keys.

The computer 800 may communicate with the public network 110 through the network module 845. The network module 845 may be configured as an Ethernet interface, a token ring interface, of the like.

The computer 800 may communicate with the fingerprint authentication module 300 of FIG. 3 through USB module 850. In addition, the computer 800 may display messages to the user using the display module 835 and receive input from the user through the PCI module 860 from a keyboard, mouse, or the like as is well known to those of skill in the art.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
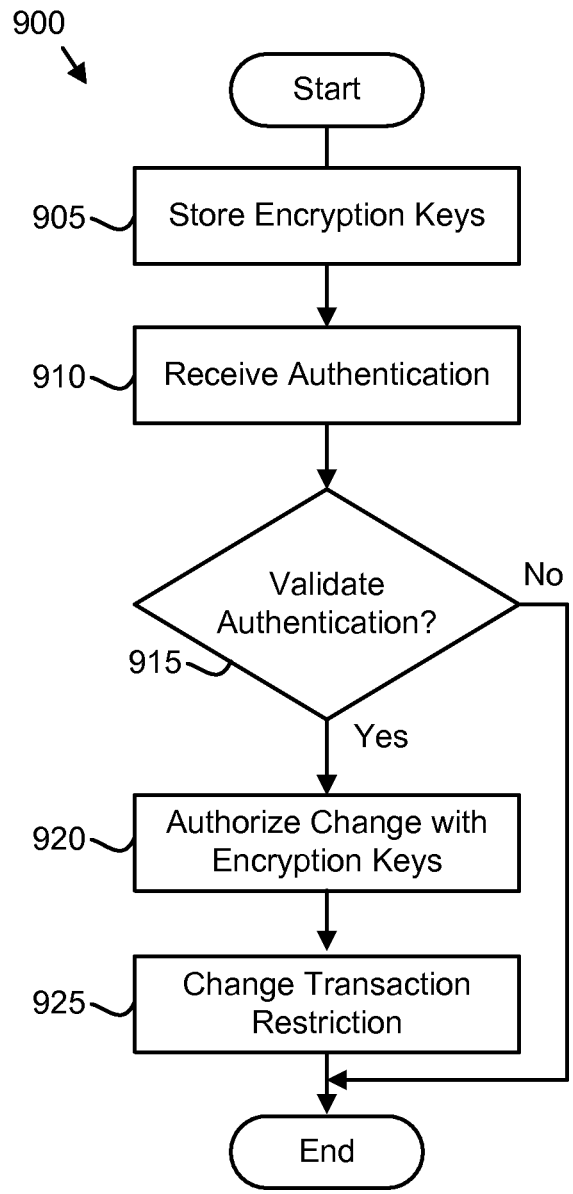
FIG. 9 is a schematic flow chart diagram illustrating one embodiment of a secure authorization method of the present invention.

FIG. 9 is a schematic flow chart diagram illustrating one embodiment of a secure authorization method 900 of the present invention. The method 900 substantially includes the steps to carry out the functions presented above with respect to the operation of the described apparatus and system of FIGS. 1-8. The description of the method 900 refers to elements of FIGS. 1-8, like numbers referring to like elements.

In one embodiment, the method 900 is implemented with a computer program product comprising a computer readable medium having a computer readable program. The authorized computer 105 may execute the computer readable program.

The method 900 begins and the security module 215 securely stores 905 one or more encryption keys. The encryption keys are associated with the payment instrument. A first encryption key may be an authentication. In one embodiment, the authentication may be received from an external device such as the fingerprint authentication module 300. In an alternate certain embodiment, the authentication may be a password.

The security module 215 resides on the authorized computer 105 that is designated by the user to authorize changes to transaction restrictions of the payment instrument. Thus the encryption keys are only available from the authorized computer 105 and changes to the transaction restriction may only be made from the authorized computer 105.

In one example, the payment server 115 may communicate a software process to the authorized computer 105. The software process may execute on the authorized computer 105 and establish the authentication. The software process may direct the user to place a finger on the fingerprint authentication module 300 such that the fingerprint authentication module 300 captures the digital representation of the user's fingerprint. The fingerprint authentication module 300 may communicate the digital representation to the security module 215.

The security module 215 may store 905 the digital representation as the first encryption key. Alternatively, the security module 215 may hash the digital representation as is well known to those of skill in the art and store the hashed digital representation as the first encryption key.

The security module 215 may generate a second encryption key. The second encryption key may be a random number. The security module 215 may also store 905 the second encryption key. In addition, the security module 215 may communicate the second encryption key to the payment server 115. In an alternate embodiment, the payment server 115 communicates the encryption keys to the security module 115 and the security module 215 stores 905 the received encryption keys.

The authentication module 210 receives 910 the authentication from the user of the payment instrument when the user wishes to change the transaction restriction of the payment instrument. The authentication module 210 may in part reside on the authorized computer 105. In addition, the user may only communicate the authentication to the authentication module 210 through the authorized computer 105. Thus the user must have both the authentication and access to authorized computer 105 to change the transaction restriction.

Requiring both the authentication and access to the authorized computer 105 increases the security of the payment instrument. If an unauthorized person fraudulently acquires the means of producing the authentication, the unauthorized person is still unable to change the transaction restriction unless the unauthorized person can access the authorized computer 105.

For example, if the user wishes to change a weekly spending limit for the RFID tag 500 from $100 to $200, the user may use the fingerprint authentication module 300 to generate a digital representation of the user's fingerprint. The fingerprint authentication module 300 is in communication with the authorized computer 105 and so may communicate the digital representation to the security module 215 as the authentication. The authorized computer 105 may only accept authentications that are communicated through specified ports. For example, the security module 215 may accept authentications communicated through the USB module 850 but may not accept authentications communicates through the network interface module 845.

The security module 215 validates 915 the authentication with the first encryption key. Continuing the example above, the security module 215 may compare the authentication with the stored first encryption key. The security module 215 may validate the authentication if the authentication is substantially equivalent to the first encryption key. In one embodiment, the security module 215 processes the authentication and/or first encryption key with one or more algorithms to determine equivalency.

If the security module 215 does not validate 915 the authentication, the method 900 may terminate without changing the transaction restriction. If the security module 215 does validate 915 the authentication, the security module 215 authorizes 920 a change to the transaction restriction using the second encryption key. In one embodiment, the security module 215 communicates the second encryption key to the payment server 115 to authorize 920 the change to the transaction restriction.

In one embodiment, the modification module 220 changes 925 the transaction restriction using the second encryption key and the method 900 terminates. The modification module 220 may compare the second encryption key with a third encryption key stored on the payment server 115. If the second and third encryption keys are substantially equivalent, the modification module 220 may change 925 the transaction restriction.

In one embodiment, the modification module 220 also receives a change command from the user specifying the change to the transaction restriction. For example the change command may direct the modification module 220 to change a transaction restriction by increasing a weekly spending limit from $100 to $150.

In an alternate embodiment, the change to the transaction restriction is predefined. For example, the only change for a RFID tag 500 may be resetting the initial day for a seven-day time period of a $100 spending limit to the current day. Thus, the user need only authenticate the change without specifying the change. For example, the method 900 may be configured to allow the user to start a software process on the authorized computer 105 and provide the authentication. The method 900 may change 925 the transaction restriction without additional user intervention.

The present invention securely authorizes 920 a change to a transaction restriction using both the authentication and the authorized computer 105. The present invention may increase the security of the authentication by restricting the set of computers that may authorize the change.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   [1] a computer readable storage medium storing a computer readable program;
   [2] a processor executing the computer readable program, the computer readable program comprising:
   [3] an authentication module receiving a first authentication from a user of the payment instrument at an authorized computer that the user designates as authorized to validate authentications for a payment instrument distinct from the authorized computer, electronically transacting payments with a payment server, and comprising a transaction restriction for the payment instrument;
   [4] a security module residing on the authorized computer and securely storing encryption keys, wherein a first encryption key is a hash of the first authentication, a second encryption key is shared by the security module and the payment server and is required to change the transaction restriction for payment instrument, and the payment server authorizes payments by the payment instrument at a point-of-sale station distinct from the authorized computer and changes the transaction restriction of the payment instrument;
   [5] the authentication module receiving a second authentication from the user only at the authorized computer; and
   [6] the security module validating the second authentication with the first encryption key, and authorizing a change to the transaction restriction by the payment server by communicating the second encryption key to the payment server if the second authentication is valid and the security module communicates the second encryption key through the authorized computer.

2. The apparatus of claim 1, further comprising a modification module changing the transaction restriction using the second encryption key.

3. The apparatus of claim 1, wherein the authentication module comprises a fingerprint authentication module, the first authentication is a first fingerprint authentication, and the second authentication is a second fingerprint authentication.

4. The apparatus of claim 1, wherein the security module comprises a Trusted Platform Module.

5. The apparatus of claim 1, wherein the payment instrument is a radio frequency identification (RFID) tag.

6. The apparatus of claim 1, wherein the payment instrument is a credit card.

7. The apparatus of claim 1, wherein the transaction restriction limits payments to a specified amount during a specified time period.

8. The apparatus of claim 1, wherein the transaction restriction limits payments to a specified payee.

9. A computer useable medium storing a computer readable program that when executed on a computer causes the computer to:
   securely store encryption keys in a security module of an authorized computer that a user designates as authorized to validate authentications for a payment instrument distinct from the authorized computer that electronically transacts payments with a payment server and comprises a transaction restriction for the payment instrument, wherein a first encryption key is a hash of a first authentication of the user, a second encryption key is shared by the security module and the payment server and is required to change the transaction restriction for payment instrument, and the payment server authorizes payments by the payment instrument at a point-of-sale station distinct from the authorized computer and changes the transaction restriction of the payment instrument;
   receive a second authentication from the user only at the authorized computer;
   validate the second authentication with the first encryption key; and
   authorize a change to the transaction restriction by the payment server by communicating the second encryption key to the payment server if the second authentication is valid and the security module communicates the second encryption key through the authorized computer.

10. The computer useable medium of claim 9, wherein the computer readable code further causes the authorized computer to change the transaction restriction using the second encryption key.

11. The computer useable medium of claim 9, wherein the first authentication is a first fingerprint authentication, the second authentication is a second fingerprint authentication, and each fingerprint authentication is received from a fingerprint authentication module.

12. The computer useable medium of claim 9, wherein the security module comprises a Trusted Platform Module.

13. The computer useable medium of claim 9, wherein the payment instrument is a RFID tag.

14. The computer useable medium of claim 9, wherein the transaction restriction limits payments to a specified amount during a specified time period.

15. The computer useable medium of claim 9, wherein the transaction restriction limits payments to a specified payee.

16. A system comprising:
   a payment instrument electronically transacting payments with a payment server for a user and comprising a transaction restriction for the payment instrument;
   the payment server authorizing payments by the payment instrument at a point-of-sale station distinct from an authorized computer and changing the transaction restriction of the payment instrument;
   the authorized computer designated by the user as authorized to validate authentications for the payment instrument, distinct from the payment instrument, and comprising:
      an authentication module receiving a first authentication from the user;
      a security module securely storing encryption keys, wherein a first encryption key is a hash of the first authentication and a second encryption key is shared by the security module and the payment server and is required to change the transaction restriction for payment instrument;
      the authentication module receiving a second authentication from the user only at the authorized computer;

the security module validating the second authentication with the first encryption key, and authorizing a change to the transaction restriction by the payment server by communicating the second encryption key to the payment server if the second authentication is valid and the security module communicates the second encryption key through the authorized computer; and the payment server further comprising a modification module changing the transaction restriction using the second encryption key.

17. The system of claim 16, wherein the authentication module comprises a fingerprint authentication module, the first authentication is a first fingerprint authentication, and the second authentication is a second fingerprint authentication.

18. The system of claim 16, wherein the security module comprises a Trusted Platform Module.

19. The system of claim 16, wherein the payment instrument is a Smart Card® electronic card.

20. A method for securely authorizing changes to a transaction restriction, the method comprising:

securely storing, by use of a processor, encryption keys in a security module of an authorized computer that a user designates as authorized to validate authentications for a payment instrument distinct from the authorized computer that electronically transacts payments with a payment server and comprises a transaction restriction for the payment instrument, wherein a first encryption key is a hash of a first authentication of the user, a second encryption key is shared by the security module and the payment server and is required to change the transaction restriction for payment instrument, and the payment server authorizes payments by the payment instrument at a point-of-sale station distinct from the authorized computer and changes the transaction restriction of the payment instrument;

receiving a second authentication from the user only at the authorized computer;

validating the second authentication with the first encryption key;

authorizing a change to the transaction restriction by the payment server by communicating the second encryption key to the payment server if the second authentication is valid and the security module communicates the second encryption key through the authorized computer; and changing the transaction restriction using the second encryption key.

* * * * *